US012106752B2

(12) United States Patent
Campbell et al.

(10) Patent No.: US 12,106,752 B2
(45) Date of Patent: Oct. 1, 2024

(54) SPEECH RECOGNITION USING MULTIPLE SENSORS (71) Applicant: NURA HOLDINGS PTY LTD, Brunswick (AU)

(72) Inventors: Luke John Campbell, Brunswick (AU); Dragan Petrovic, Union City, CA (US)

(73) Assignee: Nura Holdings Pty Ltd, Brunswick (AU)

( * ) Notice: Subject to any disclaimer, the term of this patent is extended or adjusted under 35 U.S.C. 154(b) by 333 days.

(21) Appl. No.: 17/414,934

(22) PCT Filed: Dec. 20, 2019

(86) PCT No.: PCT/US2019/068067
§ 371 (c)(1),
(2) Date: Jun. 16, 2021

(87) PCT Pub. No.: WO2020/132576
PCT Pub. Date: Jun. 25, 2020

(65) Prior Publication Data
US 2022/0068266 A1  Mar. 3, 2022

Related U.S. Application Data (60) Provisional application No. 62/784,201, filed on Dec. 21, 2018.

(51) Int. Cl.
*G10L 15/187* (2013.01)
*G10L 15/22* (2006.01)
(Continued)

(52) U.S. Cl.
CPC .......... *G10L 15/187* (2013.01); *G10L 15/22* (2013.01); *G10L 15/28* (2013.01); *H04R 1/04* (2013.01); *H04R 1/406* (2013.01); *H04R 3/005* (2013.01)

(58) Field of Classification Search
CPC ....... G10L 15/187; G10L 15/22; G10L 15/28; H04R 1/04; H04R 1/406; H04R 3/005
See application file for complete search history.

(56) References Cited

U.S. PATENT DOCUMENTS 9,401,158 B1 * 7/2016 Yen .................... H04R 3/005
10,621,973 B1 * 4/2020 McVicker ............ H04R 1/14
(Continued)

FOREIGN PATENT DOCUMENTS

EP          2009620 B1    11/2012
WO       2011146903 A1    11/2011
WO    WO 2020/132576      6/2020

OTHER PUBLICATIONS

International Search Report and Written Opinion mailed on Mar. 5, 2020 for International Application No. PCT/US2019/068067, filed on Dec. 20, 2019 (8 pages).

*Primary Examiner* — Mark Villena
(74) *Attorney, Agent, or Firm* — Knobbe, Martens, Olson, & Bear, LLP (57) ABSTRACT

Introduced here are systems and methods to increase accuracy of speech recognition by utilizing multiple sensors placed at multiple speech transmission regions such as a user's lips, throat, ear canal, etc. The various speech transmission regions are better at transmitting certain phonemes, and a sensor placed close to a particular speech transition region can more accurately detect the phoneme transmitted through the particular speech transmission region. For example, a microphone placed close to the lips can better detect labial phonemes such as m, n, p, and b, than a microphone placed close to the throat. Further, disclosed here are ways to reduce energy consumption while performing speech recognition.

32 Claims, 7 Drawing Sheets

(51) Int. Cl.
*G10L 15/28* (2013.01)
*H04R 1/04* (2006.01)
*H04R 1/40* (2006.01)
*H04R 3/00* (2006.01)

(56) References Cited

U.S. PATENT DOCUMENTS

| | | |
|---|---|---|
| 10,679,621 B1* | 6/2020 | Sundaram ............... H04W 4/12 |
| 2012/0051548 A1* | 3/2012 | Visser .................... H04R 3/005 |
| | | 381/56 |
| 2013/0191115 A1* | 7/2013 | Suzuki ................... G10L 21/06 |
| | | 704/9 |
| 2015/0073794 A1 | 3/2015 | Kalinli-Akbacak et al. |
| 2015/0179178 A1* | 6/2015 | Usher ................... G10L 21/038 |
| | | 704/500 |
| 2016/0267899 A1* | 9/2016 | Gauger, Jr. ............ H04R 3/005 |
| 2017/0116995 A1* | 4/2017 | Ady ...................... H04W 12/06 |
| 2017/0178631 A1* | 6/2017 | Boesen ............... G06F 3/04883 |
| 2017/0332186 A1 | 11/2017 | Riggs et al. |
| 2018/0336918 A1* | 11/2018 | Zadgaonkar ............ G10L 15/02 |
| 2018/0367882 A1* | 12/2018 | Watts ................... H04R 1/1083 |
| 2019/0325887 A1* | 10/2019 | Karkkainen ..... G10K 11/17827 |
| 2020/0184996 A1* | 6/2020 | Steele ..................... H04R 5/00 |

* cited by examiner

SPEECH RECOGNITION USING MULTIPLE SENSORS

CROSS-REFERENCE TO RELATED APPLICATION

The present application is a U.S. National Phase Entry of International PCT Application No. PCT/US2019/068067 filed on Dec. 20, 2019, and entitled "Speech Recognition Using Multiple Sensors," which claims priority to the U.S. provisional patent application Ser. No. 62/784,201 filed on Dec. 21, 2018, titled "Speech Recognition Using Multiple Sensors," which is incorporated herein by reference in its entirety.

TECHNICAL FIELD

The present application is related to sensors used in speech recognition, and more specifically to methods and systems that use multiple sensors to recognize speech.

BACKGROUND

Today, voice interaction with a computer is becoming ubiquitous, and speech recognition plays a central role. Speech recognition, however, is fraught with inaccuracies due to poor acoustics or speaker idiosyncrasies such as accents, mode of speech, etc. Further, speech recognition tends to consume a significant amount of processing time and energy.

SUMMARY

Introduced here are systems and methods to increase accuracy of speech recognition by utilizing multiple sensors placed at multiple speech transmission regions such as a user's lips, throat, ear canal, etc. The various speech transmission regions are better at transmitting certain phonemes, and a sensor placed close to a particular speech transition region can more accurately detect the phoneme transmitted through the particular speech transmission region. For example, a microphone placed close to the lips can better detect labial phonemes such as m, n, p, and b than a microphone placed close to the throat. Further, disclosed here are ways to reduce energy consumption while performing speech recognition.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Speech Recognition Using Multiple Sensors

Introduced here are systems and methods to increase accuracy of speech recognition by utilizing multiple sensors placed at multiple speech transmission regions such as a user's lips, throat, ear canal, etc. The various speech transmission regions are better at transmitting certain phonemes, and a sensor placed close to a particular speech transition region can more accurately detect the phoneme transmitted through the particular speech transmission region. For example, a microphone placed close to the lips can better detect labial phonemes such as m, n, p, and b than a microphone placed close to the throat. Further, disclosed here are ways to reduce energy consumption while performing speech recognition.

One of the most accurate speech recognition systems today is Google's speech for recognition for native speakers. The accuracy of the system is 95%. However, speech recognition for speakers with an accent drop significantly, down to 59% accuracy. By using multiple sensors placed along various speech transmission regions, the accuracy of speech recognition can exceed 95% for both native and non-native speakers.

Figure 1A:
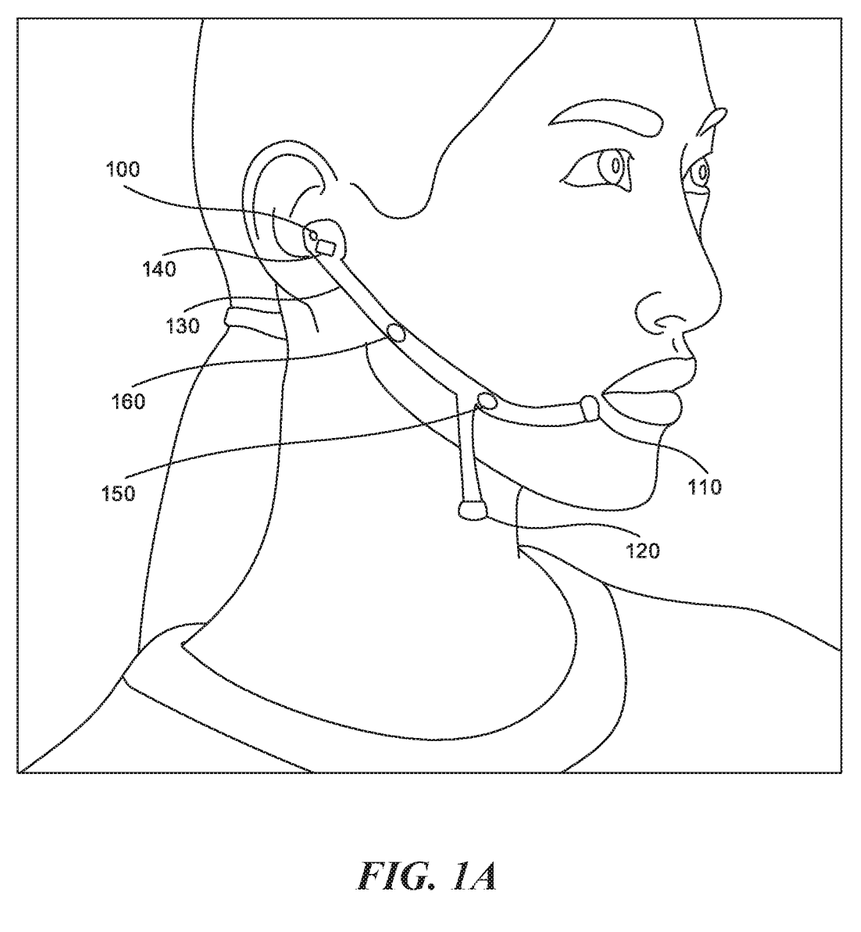
FIGS. 1A-1B show multiple sensors surrounding a user and recording user's speech.
Figure 1B:
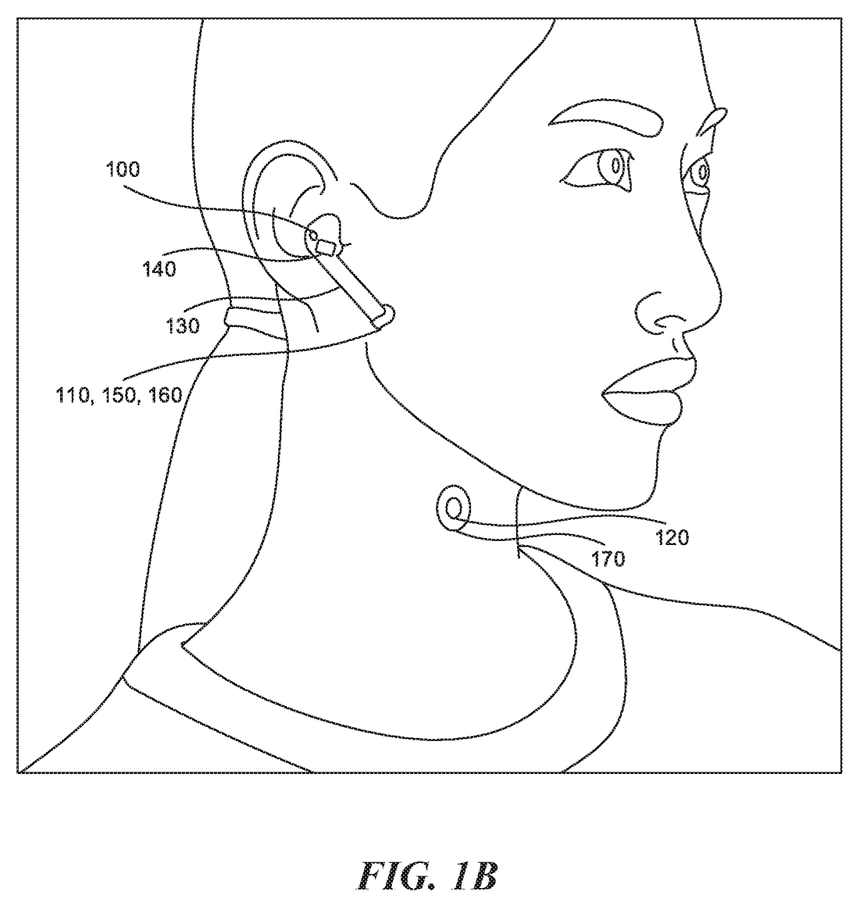

FIGS. 1A-1B show multiple sensors surrounding a user and sensing user's speech. The sensors 100, 110, 120, 150 and/or 160 can be associated with a hearing device 130 such as an earbud, a headphone, a hearing aid, etc. The sensors 100, 110, 120, 150 and/or 160 can be in wired or wireless communication with a processor 140 associated with the hearing device 130. The sensors 100, 110, 120, 150 and/or 160 can be a microphone, a piezoelectric sensor, a capacitive sensor, a dry electrode, an accelerometer, a laser, an infrared sensor, etc.

The sensors 100, 110, 120, 150 and/or 160 can be disposed in proximity to multiple speech transmission regions associated with a user's speech system. The sensors 100, 110, 120, 150 and/or 160 can sense sounds associated with the speech transmission regions. A speech transmission region can be a location along the user's speech system where a sound associated with the user's speech is audible, as described below.

A first sensor 100 can be disposed at an entrance or within a user's ear canal, to measure a first sound transmitted through the user's ear canal. The first sound transmitted through the user's ear canal can use bone conduction for transmission and is usually a low frequency sound. The first sensor 100 can be physically attached to the hearing device 130 or can be in wireless communication with the hearing device 130. For example, the first sensor 100 can be enclosed within the hearing device 130, as described below.

A second sensor 110 can be disposed proximate to the user's lips, to measure a second sound transmitted through the user's lips. The second sensor 110 can be physically attached to the hearing device 130 as shown in FIG. 1 or can be in wireless communication with the hearing device 130.

A third sensor 120 can be disposed proximate to the user's throat, to measure a third sound transmitted through the user's throat. The third sensor 120 can be physically attached to the hearing device 130 as shown in FIG. 1A, or the third sensor 120 can be in wireless communication with the hearing device 130. The third sensor 120 can be attached to the user's throat with a sticker 170 as shown in FIG. 1B. Sensors 150 and/or 160 can be placed in proximity to coronal and dorsal speech transmission regions, as described below.

The first sensor 100 can measure low frequencies of the user's speech because the sound heard within or at the entrance of the user's ear canal is transmitted using bone conduction through the user's head. The second sensor 110, 120, 150, 160 can measure high frequencies of the user's speech. Human speech ranges between 80 Hz and 300 Hz. The low frequencies detected by the first sensor can range between 80 Hz to 200 Hz, while the high frequencies detected by the second sensor can range between 180 Hz to 300 Hz. The processor 140 can receive the low frequencies recorded by the first sensor and the high frequencies recorded by the second sensor and combine them into a recording of the person's speech.

In addition, multiple sensors can be placed outside of the person's head, for example close to the person's mouth or throat, such as sensors 110, 120, 150, 160, forming a sensor array. Each sensor in the sensor array is spatially apart from the other sensors, and each sensor can be a known distance away from the source of the person's speech. When the person speaks, each sensor 110, 120, 150, 160 receives the person speech at a different time than the rest of the sensors in the sensor array due to the different distances between a source of the speech and the position of the sensor. Consequently, the time delay to receive the speech of the person wearing the hearing device 130 at each of the sensors 110, 120, 150, 160 is known.

To accurately detect a source of sound based on the time delay, the distance between each sensor in the sensor array needs to smaller than the wavelength of the sound detected. To detect the high frequencies, the sensors need to be closer together than when detecting low frequencies. To accurately detect the source of human speech, the distance between the sensors needs to be less than 1 m.

If sensors 110, 120, 150, 160 receive ambient speech from people other than the person wearing the hearing device 130, the time delay to receive the other person speech between the different sensors 110, 120, 150, 160 is different, than when the sensors 110, 120, 150, 160 receive the speech of the person wearing the hearing device 130. The sensors 110, 120, 150, 160 can send the received speech to the processor 140. Based on the different times at which the speech was received, the processor 140 can filter out the ambient speech and noise, and even in a crowded room, detect the speech of the person wearing the hearing device 130.

Sensors 100, 110, 120, 150, 160 can be used to measure a sound away from the primary target recording location. For example, sensors 100, 110, 120, 150, 160 can be considered to be proximate to the user's lips and can measure the sounds transmitted by the user's lips. In a more specific example, two sensor arrays in an earbud can be used to measure signals coming from the user's lips even though the primary target recording location of the sensor 100 may not be the user's lips.

Figure 2:
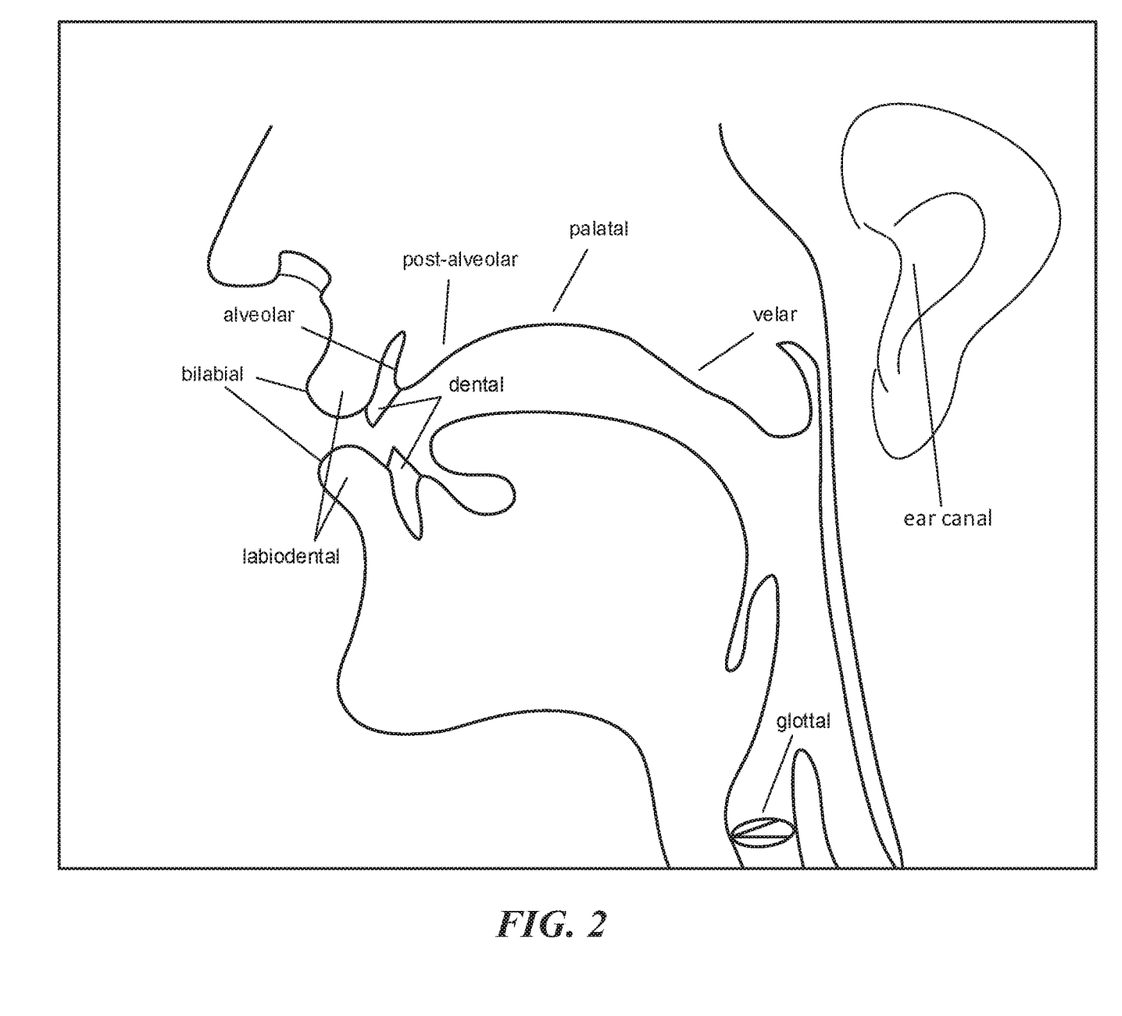
FIG. 2 shows speech transmission regions associated with a user's speech system.

FIG. 2 shows speech transmission regions associated with a user's speech system. There are multiple speech transmission regions associated with the user's speech system as shown in FIG. 2. The four major speech transmission regions are labial, coronal, dorsal, and laryngeal. The labial transmission regions can include bilabial, labiodental and linguo-labial regions. The coronal speech transmission region can include linguo-labial, dental, alveolar, post-alveolar and retro flex regions. Dorsal region can include palatal, velar and uvular regions. Laryngeal speech transmission region can include epi-glottal and glottal regions.

Phonemes such as m, n, p, b, t, v, θ, ð, etc. are detected well when the sensor 110 in FIGS. 1A-1B is placed close to the labial speech transmission region. Phonemes such as r, $d_3$, s, z, θ, tʃ, ð, etc. are detected well when the sensors 110, 150 and/or 160 in FIGS. 1A-1B are placed close to the coronal speech transmission region. Phonemes such as k, g, j, etc. are detected well when the sensors 110, 150 and/or 160 are placed close to the dorsal speech transmission region. Phonemes such as h, u:, and a: are detected well when the sensors 110 and/or 120 is placed close to the laryngeal speech transmission region.

The speech transmission regions can include the ear canal of the user because user's speech is transmitted through the user's head by bone conduction. Consequently, the user's ear canal can be used to detect user's speech, in particular, low frequencies of the user's speech. The sensor, such as a microphone, 100 in FIGS. 1A-1B can be placed at an entrance or within the user's ear canal to detect and record user's speech. The single sensor can detect multiple phonemes. Further, the single sensor can detect phonemes produced from multiple speech transmission regions.

Different phonemes have different sites of generation of the component of the sound. This means that the transfer function between the site of generation and each recording instrument is different. Across frequencies there can be different amplitudes, and phase/delay/latency. By comparing the data recorded from different sites around the head/body/room a phoneme can be more accurately identified. For example, sounds generated near the lips are louder near the lips than the throat. Therefore, if a sound is recorded and the sensor at the lips shows a much louder signal than the throat sensor then it becomes more probable that the phoneme that is trying to be identified is one generated near the lips. Consequently, processor can select a measurement of the sensor near the lips to perform the speech recognition and/or can rely more on the sound recorded by the sensor near the lips to perform the speech recognition.

This additional information can be used to enhance an accuracy of a speech recognition algorithm by determining a difference between a part of the first sound and a part of the second sound and based on the difference select the part of the first sound or the part of the second sound. For example, to enhance the accuracy of the speech recognition algorithm, the processor can modify the probability of which phoneme was spoken that has been generated by any other speech recognition algorithm such as a neural network based approach. The processor can modify probabilities of phoneme predictions based on a differential information recorded from each sensor. The differential information can include a difference between the amplitude, and/or phase/delay/latency between two or more sounds measured by two or more different sensors. In addition to, or alternatively, this additional information can be implicitly extracted by building a neural network model with inputs from multiple sensor sites with the neural network built in such a way to benefit from the differential information.

The difference between the part of the first sound and the second sound can be reflected in the amplitude, and/or phase/delay/latency. Based on the difference, such as one sensor is detecting a higher volume of sound, or one sensor detects the sound sooner than the other sensor, the processor can determine that the one sensor is closer to the location of the speech transmission region. Consequently, the processor can determine the likely speech transmission region, and the likely group of phonemes that is being spoken. Further, the processor can select a measurement of the sound recorded by the one sensor to perform the speech recognition and/or can rely more on the one sensor closer to the speech transmission region to perform speech recognition then on the other sensor.

The analysis can be done locally, or as is presently more common, by streaming the recorded sound to a cloud-based provider. Using the current technology, multiple recording sensor signal channels are sent to the cloud-based provider instead of just one which is used today.

Figure 3A:
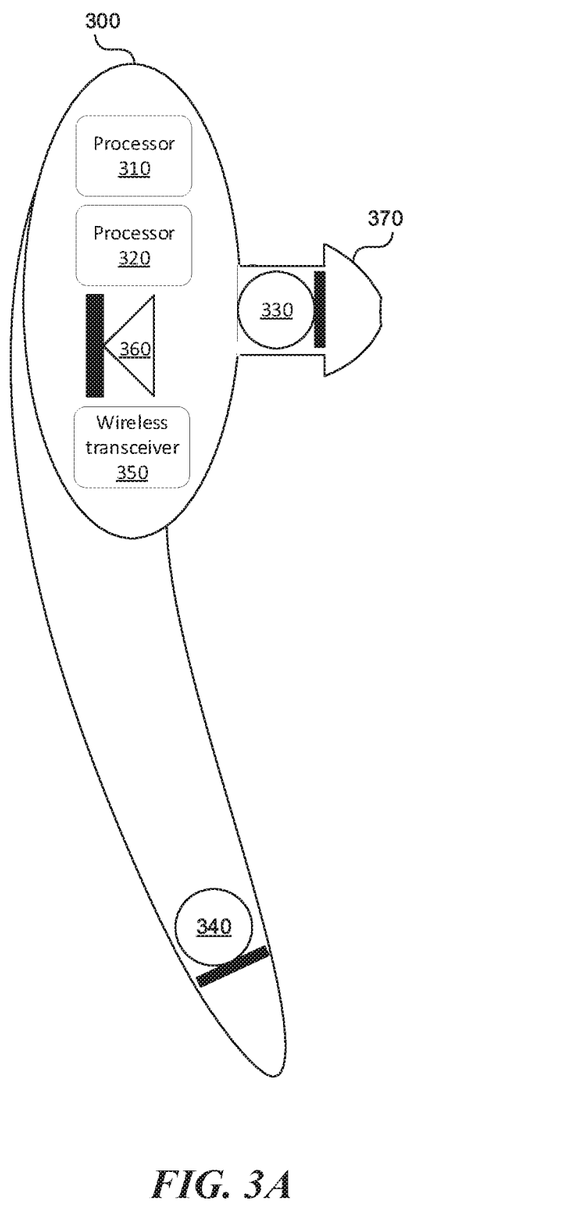
FIGS. 3A-3B show a hearing device, according to various embodiments.
Figure 3B:
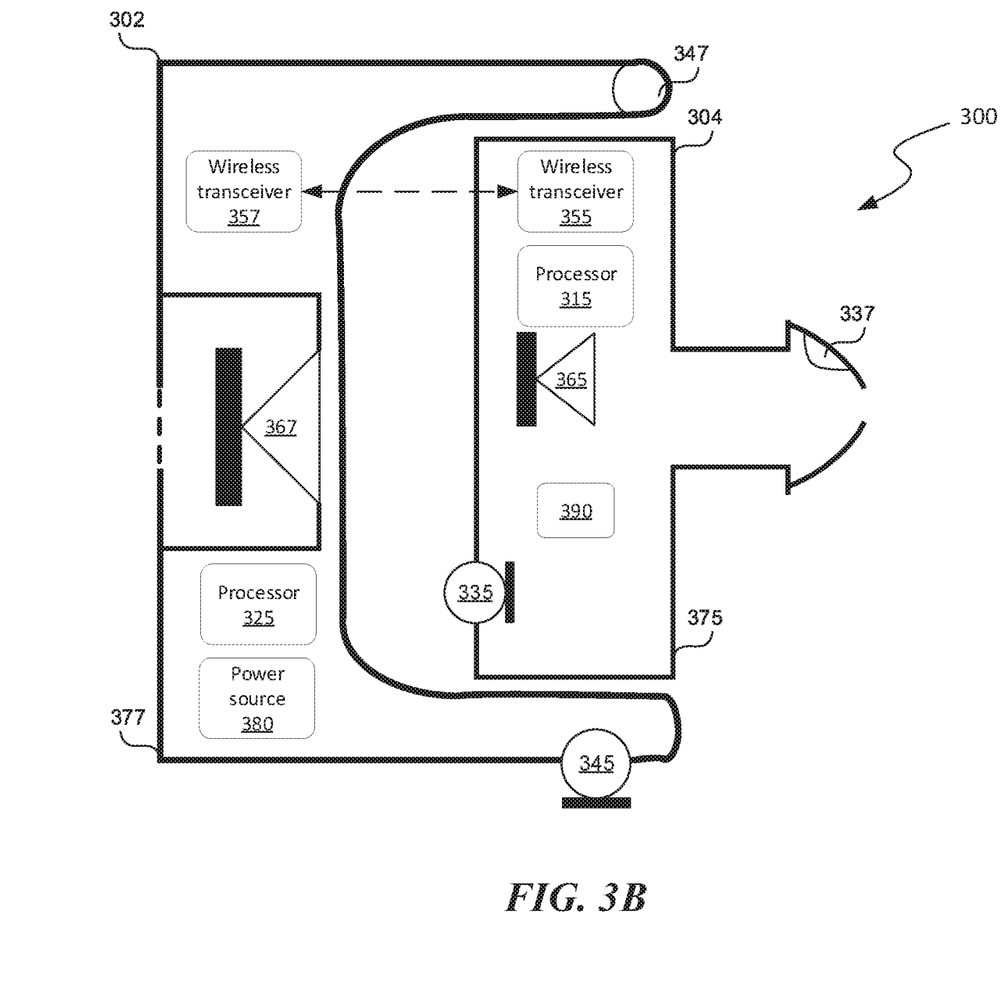

FIGS. 3A-3B show a hearing device, according to various embodiments. The hearing device 300 can be an earpiece such as a wired or wireless earbud, a hearing aid, a headphone etc. The hearing device 300 can include an earcup 302 and an earpiece 304 in FIG. 3B, which are in wired or wireless communication with each other. The earcup 302 and the earpiece 304 can be part of the hearing device 300, such as a headphone. The hearing device 300 can include one or more processors 310, 315, 320 and/or 325; one or more sensors, 330, 335, 337, 340, 345 and/or 347; a transceiver, 350, 355, or 357; an audio emitter, 360, 365, or 367; and an enclosure, 370, 375, or 377, etc.

The sensors 330, 335 and/or 345 can be microphones to record sound. The sensors 337 and/or 347 can be electrodes and/or capacitive sensors to detect auditory evoked potential signal (AEP). AEP is a type of EEG signal emanating from the brain through the scalp in response to an acoustical stimulus. The sensors 337 and/or 347 can measure any AEP, such as auditory brainstem response, mid latency response, cortical response, acoustic change complex, auditory steady state response, complex auditory brainstem response, electrocochleography, cochlear microphonic, or cochlear neurophonic AEP. The sensor 320 can also measure an acoustic reflex (also known as the stapedius reflex, middle-ear muscles (MEM) reflex, attenuation reflex, or auditory reflex). The acoustic reflex is an involuntary muscle contraction that occurs in the middle ear in response to high-intensity sound stimuli or when the person starts to vocalize.

A first processor 310 or 315 can be configured to consume a low amount of energy while waiting to receive an activating vocalization. The first processor 310 or 315 can be configured to always consume a low amount of energy, and to send user's speech to the second processor 320 or 325, or a remote processor for speech recognition. The first processor 310 or 315 can be configured to operate as a dual-mode processor, i.e. to operate in both low-energy mode and a high-energy mode. For example, when the first processor 310 or 315 is waiting to receive the activating vocalization, the first processor 310 or 315 can operate in low-energy mode, and when the first processor 310, 315 is performing speech recognition, the processor 310 can operate in a high-energy mode.

The first processor 310 or 315 can receive one or more recordings made by one or more sensors: 330, 335, 337, 340, 345 and/or 347. The first processor 310 or 315 can recognize the activating vocalization based on the one or more recordings. The activating vocalization can be a wake phrase or a wake words such as "Nura," "okay Nura," "wake up Nura."

etc. Upon recognizing the activating vocalization, the first processor 310 or 315 facilitate recognition of a user's speech.

To facilitate recognition of the user's speech, the first processor 310 or 315 can switch into the high-energy mode to perform speech recognition, activate the second processor 320 or 325 to perform the speech recognition, or can transmit one or more recordings of the user's speech to a remote processor, such as a cloud processor.

The transmission can be performed using the transceiver 350, 355 and/or 357. The transceiver 350, 355 and/or 357 can send the recording of the user's speech via a cellular network, a wireless network, etc., to the remote processor. The transceiver 350, 355 and/or 357 can send the recording to an intermediary such as a cell phone, smartwatch, a home device, etc., which then forwards the recording to the remote processor, or the transceiver 350, 355 and/or 357 can directly communicate with a remote processor.

The sensors 330, 335, 337, 340, 345 and/or 347 can be any sensor capable of recording a signal representing the user's speech. For example, the sensors 330, 335, 337, 340, 345 and/or 347 can be a microphone, an electrode, a capacitive sensor, or any combination thereof. The first processor 310 or 315 can reduce energy consumption of the hearing device 300 by keeping only one sensor 330, 335, 337, 340, 345 or 347 operating to detect whether user is speaking, and keeping the remainder of the sensors 330, 335, 337, 340, 345 and/or 347 in the low-energy mode or off, until the active sensor detects user's speech.

For example, the sensor 330 and/or 335 can be insulated from ambient sound by an enclosure 370 or 375 and can be better at detecting user's speech because the sensor 330 and/or 335 is insulated from ambient sound. The sensor 330 can be placed at the entrance or within the user's ear canal, so that the user's head, in addition to the enclosure 370 or 375 is also attenuating ambient sound. The sensor 335 in FIG. 3B can be placed within the enclosure 375 which is placed at the entrance or within the user's ear canal. The sensor 335 can detect the user's speech conducted through a cavity defined by the enclosure 375. Once the sensor 330 receives a signal, such as a sound, the sensor 330 can send a notification to the first processor 310 or 315 to activate the remainder of the sensors 340. By activating the remainder of the sensors 340 only at select times, the energy consumption of the hearing device 300 is reduced.

The sensors 330 and/or 335 does not consume much energy even while operating in the high-energy mode, because the sensor 330 and/or 335 does not detect ambient sound and does not spend energy recording ambient sound. However, the sensor 330 and/or 335 is poor at detecting phonemes transmitted through the lips, thus, necessitating the use of another sensor 330 and/or 335. Overall, even with the use of two sensors, one within the ear canal and another one close to the lips, the amount of energy consumed by the two sensors is less than just using one sensor close to the lips because the sensor close to the lips is exposed to the ambient sound, and has consume more energy to detect the activating vocalization than the sensor 330 and/or 335 isolated from the ambient sound.

The sensor 330 can measure an otoacoustic emission generated within the user's ear canal in response to a received sound. Based on the measured otoacoustic emission the processor 310, 315, 320 and/or 325 can obtain the user's hearing profile indicating how the user perceives the received sound. In other words, the hearing profile can correlate a received frequency and amplitude, and a perceived frequency and amplitude.

Based on the hearing profile, the processor 310, 315, 320 and/or 325 can modify the sound delivered to the user. For example, when the hearing device 300 is playing music to the user, the processor 310, 315, 320 and/or 325 can automatically equalize the music prior to the audio emitter 360, 365 and/or 367 emitting the music to the user. Further, based on the hearing profile, the processor 310, 315, 320 and/or 325 can identify the user. For example, the processor 310, 315, 320 and/or 325 can measure the hearing profile of the user and search the database of hearing profiles for matching hearing profile. If the processor 310, 315, 320 and/or 325 finds the match, the processor can identify the user.

Creating the hearing profile based on the otoacoustic emission can consume a high amount of energy. Consequently, the processor 310 and/or 315 can create a hearing profile when operating in the high-energy mode, or the processor 310 and/or 315 can activate the processor 320 and/or 325 to operate in high-energy mode while creating the hearing profile.

Based on one or more phonemes contained in the activating vocalization, the processor 310, 315, 320 and/or 325 can determine a sensor among the sensors 330, 335, 337, 340, 345 and/or 347 likely to record the one or more phonemes. The processor 310, 315, 320, and/or 325 can rely on the sensor more likely to detect the phoneme more than on a remainder of the sensors. The one or more sensors likely to record the one or more phonemes in the activating vocalization can be continuously operated in a high-energy mode, while the rest of the sensors operate in low-energy mode, until the activating vocalization is received. Once the activating vocalization received, all of the sensors 330, 335, 337, 340, 345 and/or 347 can operate in high-energy mode to measure the user's speech. A processor can select certain phonemes in the activating vocalization as more distinct and/or less frequently used in speech, and can only operate the one or more sensors likely to detect the selected phonemes in high-energy mode continuously.

For example, the sensor 340 can be more likely to record labial phonemes, while the sensor 330 can be more likely to record laryngeal phonemes. To detect "okay Nura," the sensor 330 can detect a user's speech while the user is saying "okay" and send a signal to the processor 310, 315, 320 and/or 325 to activate the sensor 340. The processor 310, 315, 320 and/or 325 can activate the sensor 340, and receive recordings from sensors 330, 335, 337, 340, 345 and/or 347 of user's speech "Nura." The processor 310, 315, 320 and/or 325 can rely on the sensor 330 and/or 335 to detect phonemes u: and a:, while sensor 340 and/or 345 can detect phonemes n and r. The sensor 330 and/or 335 can pick up low frequency sounds transmitted by the laryngeal speech transmission region, because sensor 330 and/or 335 can pick up low frequency sounds transmitted using bone conduction. If there is a conflict between sensors 330, 335 and 340, 345 where sensor 340, 345 does not indicate the existence of the phoneme u:, while sensor 330, 335 indicates the existence of the phoneme u:, the processor 310, 315, 320, 325 can resolve the conflict by relying on the recording of the sensor 330, 335 because the sensor 330, 335 is more likely to detect the phoneme u:.

The recordings of the user's speech made by the sensors 330, 335, 337, 340, 345 and/or 347 can be tagged with the phonemes that each recording is more likely to detect. The tags can aid in speech recognition. For example, the processor performing speech recognition can receive the recording and a list of phonemes that the recording is likely to represent correctly. Speech recognition can be performed using an artificial intelligence such as a neural network, a statistical modeling system, etc.

The hearing device 300 can reduce energy consumption by transitioning the second processor 320, 325 into a high-energy mode after the first processor 310, 315 recognizes the activating vocalization. The second processor 320, 325 can operate in a low-energy mode when not activated and can operate in the high-energy mode upon being activated. The second processor 320, 325 can perform the speech recognition when operating in the high-energy mode.

The second processor can be the processor 325 in FIG. 3B, associated with the earcup 302. When the second processor 325 is associated with the earcup 302, the second processor 325 can have access to an energy source 380, which is larger than an energy source 390 associated with the earpiece 304. The energy source 380 can be larger than the energy source 390 because the earcup 302 has a larger volume than the earpiece 304, due to the fact that the earcup does not have to fit into the user's ear.

The first processor 310, 315 can reduce energy consumption by receiving the user's speech from the sensors 330, 335, 340, 345 and sending the user's speech to a remote processor to perform speech recognition. The remote processor can be a processor associated with a laptop, a home device, a mobile device, an Internet server, such as a cloud computer, etc.

Figure 4:
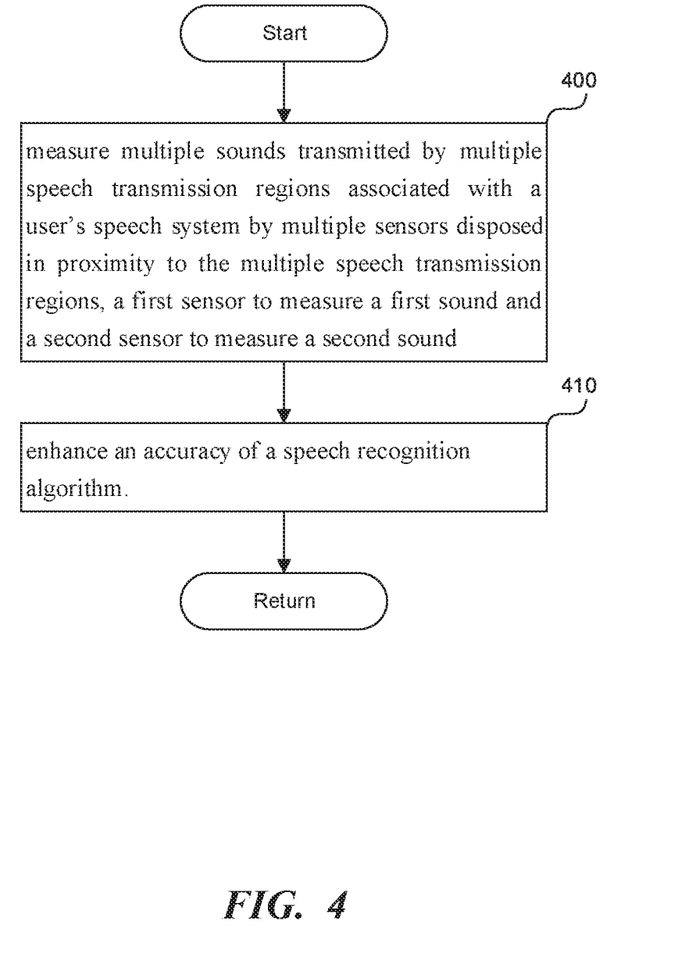
FIG. 4 is a flowchart of a method to perform speech recognition using multiple sensors.

FIG. 4 is a flowchart of a method to perform speech recognition using multiple sensors. In step 400, multiple sensors can measure record multiple sounds transmitted by multiple speech transmission regions associated with a user's speech system. The sensors can be placed in proximity to multiple speech transmission regions. The speech transmission region is a location along the user's speech system where a sound among multiple sounds associated with the user's speech is audible, as described in FIG. 2. The speech transmission region can include points of articulation in the user's speech system as well as the user's ear canal.

A first sensor can be placed at or within a user's ear canal and can measure a first sound. The first sound can include a low frequency speech, because low frequency speech can be transmitted through bone conduction into the user's ear canal. A second sensor can be placed outside of the user's head, for example close to the user's mouth or throat. The second sensor can measure a second sound which can include a high frequency speech. A processor can combine the low and the high frequency speech into a recording of the user's voice. The first sound and the second sound can be different aspects of the same sound, where the first sound is a sound detected at a first location by the first sensor, and the second sound is the same sound detected at a second location by the second sensor. For example, when the user is speaking, the first sound can be the user's speech detected at the entrance of or within the ear canal, while the second sound can be the user's speech detected at the user's mouth or throat.

In step 410, the processor can enhance an accuracy of a speech recognition algorithm by determining a difference between a part of the first sound and a part of the second sound and based on the difference select the part of the first sound or the part of the second sound or modify a probability of phoneme predictions based on a differential information recorded from each sensor, as described in this application. The differential information can include a difference between the amplitude, and/or phase/delay/latency between two or more sounds measured by two or more different sensors.

The processor can reconstruct a user's speech by selecting a first part of speech from the first sound and a second part of speech from the second sound based on a criterion indicating which sensor among the first and the second sensor is better at sensing the first part of speech and the second part of speech. For example, the criterion can specify a frequency range, and/or phonemes to use when choosing the appropriate sensor.

When the criterion can specify phonemes, the processor can select a phoneme from a sound recorded by a sensor placed closer to a transmission source of the phoneme than the other sensor. For example, the processor can select labial phonemes from the second sound when the second sensor is placed closer to the user's lips than the first sensor. In another example, the processor can select laryngeal phonemes from the sensor placed closest to the user's throat.

When the criterion can specify a frequency range, the processor can select a low frequency sound from the first sensor placed at the entrance of or within the user's ear canal and a high frequency sound from the second sensor placed external to the user's head.

A processor can recognize an activating vocalization based on multiple recordings of multiple sounds. The activating vocalization can be a word or a phrase such as "Nura", "hey Nura", "okay Nura", etc.

Upon recognizing the activating vocalization, the processor can facilitate recognition of a user's speech. The processor can conserve energy by operating in a low-energy mode while waiting for the activating vocalization. The processor can either switch into a high-energy mode while performing recognition of user's speech or can send one or more recordings of the user's speech to another processor operating in a high-energy mode.

The multiple sensors outside the user's head can form a sensor array, where each sensor receives the same sound with a unique time delay. The processor can determine a time delay to receive the same sound at each sensor among the multiple sensors. The processor can identify a source of the sound based on the multiple time delays and can extract a portion of the sound belonging to a desired source from the sound. For example, the processor can filter out the ambient speech and/or noise from the sound to isolate the desired source of sound, namely the user's speech.

Energy consumption can be reduced by having only a subset of sensors among multiple sensors operate in a high-energy mode, while the remainder of the sensors operate in a low-energy mode or are completely off. The subset of sensors can be better at detecting user's speech than the remainder of the sensors because the sensors can be surrounded by an enclosure attenuating ambient sound reaching the subset of sensors. The subset of sensors, upon detecting user's speech, can send a notification to the processor indicating a detection of the user's speech. Upon receiving the notification, the processor can activate a remainder of sensors among multiple sensors to record user's speech.

One or more sensors can measure an otoacoustic emission generated within a user's ear canal in response to a received sound. The sensor can be placed at an entrance or within the user's ear canal. The processor can obtain a user's hearing profile based on the measured otoacoustic emission. The profile can indicate how the user perceives sound by correlating a received frequency and amplitude, and a perceived frequency and amplitude.

Based on the user's hearing profile, the processor can modify a sound delivered to a user based on the user's hearing profile. For example, the processor can increase the user's enjoyment of music by matching the user's perception of music to an intended perception of music, for example as intended by the artist recording the song. Further, based on the user's hearing profile, the processor can identify the user because the user's hearing profile is unique to the user.

To detect the activating vocalization, the processor can determine a sensor among the multiple sensors more likely to record the one or more phonemes contained in the activating vocalization. For example, if the activating word is "okay Nura", the phoneme n is more likely to be detected by the sensor placed in proximity to the mouth. For example, the processor can recognize the activating vocalization when the selected sensor records the one or more phonemes. In another example, the processor can recognize the activating vocalization by weighing the recorded phonemes from the multiple streams such that the sensor likely to record the phoneme is weighed more than the sensor less likely to record the phoneme. In other words, the processor can rely on the sensor to detect the phoneme more than on a remainder of the sensors among the multiple sensors.

Computer

Figure 5:
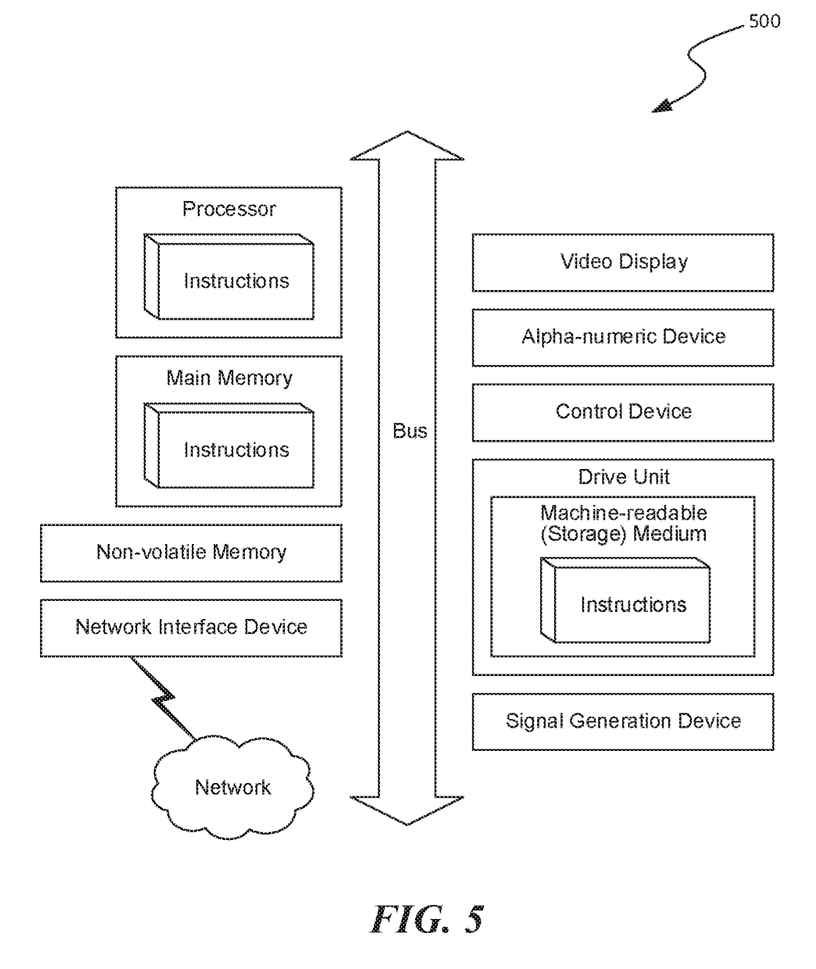
FIG. 5 is a diagrammatic representation of a machine in the example form of a computer system within which a set of instructions, for causing the machine to perform any one or more of the methodologies or modules discussed herein, may be executed.

FIG. 5 is a diagrammatic representation of a machine in the example form of a computer system 500 within which a set of instructions, for causing the machine to perform any one or more of the methodologies or modules discussed herein, may be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The processor of the computer system 500 can be the processor associated with the hearing device 300 in FIGS. 3A-3B. The processor of the computer system 500 can perform the various methods described in this application. The nonvolatile memory and/or the drive unit can store the database described in this application containing the various hearing profiles. The network interface device of computer system 500 can be the transceiver 350, 355 and/or 357 in FIGS. 3A-3B.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500, be unitary or distributed, span multiple locations, span multiple machines, or reside in a cloud, which may include one or more cloud components in one or more networks. Where appropriate, one or more computer systems 500 may perform, without substantial spatial or temporal limitation, one or more steps of one or more methods described or illustrated herein. As an example, and not by way of limitation, one or more computer systems 500 may perform in real time, or in batch mode. one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Pentium microprocessor or Motorola energy PC microprocessor. One of the skills in the relevant art will recognize that the terms "machine-readable (storage) medium" or "computer-readable (storage) medium" includes any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A system comprising:
    an earbud comprising a first microphone, to be disposed at an entrance or within a user's ear canal, to measure a first sound transmitted through the user's ear canal;
    a sensor comprising a second microphone, to be disposed proximate to a user's lips, to measure a second sound transmitted through the user's lips, wherein said sensor is physically separate from the earbud and wherein said sensor is configured to be secured below a head and on a body of the user; and
    a processor configured to:
        receive a first measurement of the first sound and a second measurement of the second sound;
        enhance an accuracy of a speech recognition algorithm by determining a difference between a part of the first sound and a part of the second sound, the difference between the part of the first sound and the part of the second sound comprising a difference between an amplitude and a phase associated with the first sound and the second sound recorded from each microphone;
        modify probabilities of phoneme predictions based on the difference; and
        selectively focus on one of the first or the second microphones based on the probabilities of the phoneme predictions.

2. The system of claim 1, comprising the processor configured to modify probabilities of phoneme predictions comprising the processor configured to:
    reconstruct a user's speech by selecting a labial phoneme from the second microphone and a non-labial phoneme from the first microphone.

3. The system of claim 1, comprising:
    a third microphone, to be disposed proximate to a user's throat, to measure a third sound transmitted through the user's throat.

4. The system of claim 3, comprising the processor configured to:
    reconstruct a user's speech by selecting a laryngeal phoneme from the third microphone and a non-labial and non-laryngeal phoneme from the first microphone.

5. The system of claim 1, comprising the processor configured to:
    recognize an activating vocalization based on the first measurement and the second measurement; and
    upon recognizing the activating vocalization, facilitate a recognition of a user's speech.

6. The system of claim 1, comprising the processor configured to:
    reduce energy consumption associated with the second microphone by operating the second microphone in a low-energy mode until the first microphone detects the first sound, and upon detecting the first sound, transitioning the second microphone into a high-energy mode to measure the second sound.

7. A system comprising:
    a plurality of sensors, a first sensor in the plurality of sensors to be disposed at an entrance of or within a user's ear canal and a second sensor in the plurality of sensors to be disposed in proximity to a speech transmission region associated with a user's speech system, the first sensor to sense a first sound in the user's ear canal and the second sensor to sense a second sound transmitted by the speech transmission region, wherein said second sensor is physically separate from the second sensor and wherein said second sensor is configured to be secured below a head and on a body of the user; and
    a processor configured to:
        receive one or more measurements of the first sound and the second sound;
        enhance an accuracy of a speech recognition algorithm by determining a difference between a part of the first sound and a part of the second sound and based on a difference modify probabilities of phoneme predictions; and
        determine a least one sensor in the plurality of sensors likely to sense a phoneme based on the probabilities of phoneme predictions and the one or more measurements of the first sound and the second sound.

8. The system of claim 7, comprising the processor configured to enhance the accuracy of the speech recognition algorithm comprising the processor configured to:
determine that the part of the first sound has a higher amplitude than the part of the second sound; and
rely more on the part of the first sound than the part of the second sound in the speech recognition algorithm.

9. The system of claim 7, comprising the processor configured to:
reconstruct a user's speech by selecting a first part of speech from the first sound and a second part of speech from the second sound based on a criterion indicating which sensor among the first and the second sensor is better at sensing the first part of speech and the second part of speech.

10. The system of claim 9, the processor configured to reconstruct the user's speech comprising the processor configured to:
select a phoneme from a sound recorded by a sensor placed closer to a transmission source of the phoneme than at least one other sensor.

11. The system of claim 10, the processor configured to select the phoneme comprising the processor configured to:
select labial phonemes from the second sound when the second sensor is placed closer to a user's lips than the first sensor.

12. The system of claim 9, the processor configured to reconstruct the user's speech comprising the processor configured to:
obtain the criterion indicating a frequency range; and
select a low frequency sound from the first sensor and a high frequency sound from the second sensor.

13. The system of claim 7, comprising the processor configured to:
recognize an activating vocalization based on the one or more measurements; and
upon recognizing the activating vocalization, facilitate recognition of a user's speech.

14. The system of claim 13, comprising the processor to:
continuously operate the at least one sensor in a high-energy mode.

15. The system of claim 14, comprising the processor configured to recognize the activating vocalization when the sensor senses the one or more phonemes.

16. The system of claim 13, the processor comprising a dual-mode processor configured to operate in a low-energy mode prior to recognizing the activating vocalization and to operate in a high-energy mode when facilitating the recognition of the user's speech.

17. The system of claim 7, comprising one or more sensors in the plurality of sensors to be disposed outside of the user's head and exposed to an ambient sound, the one or more sensors to extract a user's speech by removing the ambient sound from a sensed audio.

18. The system of claim 7, comprising:
an enclosure surrounding a sensor in the plurality of sensors, the enclosure to attenuate ambient sound reaching the sensor; and
the processor to reduce energy consumption by:
receiving a notification from the sensor surrounded by the enclosure, the notification indicating a detection of a user's speech, and
upon receiving the notification activating a remainder of sensors in the plurality of sensors to sense the user's speech.

19. The system of claim 7, a sensor in the plurality of sensors to be disposed in proximity to user's lips, or the sensor disposed in proximity to a user's throat.

20. The system of claim 7, comprising the processor to:
measure an otoacoustic emission generated within the user's ear canal in response to a received signal and identify the user based on the otoacoustic emission.

21. The system of claim 7, comprising:
the processor to reduce energy consumption by receiving a user's speech from the plurality of sensors and sending the user's speech to a remote processor to perform speech recognition.

22. A method comprising:
measuring a plurality of sounds transmitted by a plurality of speech transmission regions associated with a user's speech system by a plurality of sensors, a first sensor in the plurality of sensors to be disposed at an entrance of or within a user's ear canal and a second sensor in the plurality of sensors to be disposed in proximity to a speech transmission region, the first sensor to measure a first sound at the entrance of or within the user's ear canal and the second sensor to measure a second sound transmitted by the speech transmission region, wherein said second sensor is physically separate from the second sensor and wherein said second sensor is configured to be secured below a head and on a body of the user;
enhancing an accuracy of a speech recognition algorithm by determining a difference between a part of the first sound and a part of the second sound and based on a difference modify probabilities of phoneme predictions; and
determining a least one sensor in the plurality of sensors likely to sense a phoneme based on the probabilities of phoneme predictions, the first sound, and the second sound.

23. The method of claim 22, comprising:
reconstructing a user's speech by selecting a first part of speech from the first sound and a second part of speech from the second sound based on a criterion indicating which sensor among the first and the second sensor is better at sensing the first part of speech and the second part of speech.

24. The method of claim 23, said selecting comprising:
selecting a phoneme from a sound recorded by a sensor placed closer to a transmission source of the phoneme than at least one other sensor.

25. The method of claim 24, said selecting comprising:
selecting labial phonemes from the second sound when the second sensor is placed closer to a user's lips than the first sensor.

26. The method of claim 23, said selecting comprising:
selecting a low frequency sound from the first sensor and a high frequency sound from the second sensor.

27. The method of claim 22, comprising:
recognizing an activating vocalization based on a plurality of measurements of the first sound and the second sound; and
upon recognizing the activating vocalization, facilitating recognition of a user's speech.

28. The method of claim 27, comprising:
based on one or more phonemes contained in the activating vocalization, determining a sensor in the plurality of sensors likely to sense the one or more phonemes; and
continuously operating the sensor in a high-energy mode.

29. The method of claim 28, comprising:
reducing energy consumption by transitioning a processor into the high-energy mode upon recognizing the activating vocalization, the processor configured to operate in a low-energy mode when not activated and to operate in the high-energy mode upon being activated; and
recognizing the user's speech when operating in the high-energy mode.

30. The method of claim 22, comprising:
determining a time delay to receive a third sound at each sensor in the plurality of sensors;
identifying a source of the third sound based on the plurality of time delays; and
extracting a portion of the third sound belonging to a desired source from the third sound.

31. The method of claim 22, comprising:
reducing energy consumption by receiving a notification from a sensor surrounded by an enclosure attenuating ambient sound reaching the sensor, the notification indicating a detection of a user's speech; and
upon receiving the notification activating a remainder of sensors in the plurality of sensors to sense the user's speech.

32. The method of claim 22, comprising:
measuring an otoacoustic emission generated within the user's ear canal in response to a received signal and identify the user based on the otoacoustic emission.

\* \* \* \* \*

UNITED STATES PATENT AND TRADEMARK OFFICE
CERTIFICATE OF CORRECTION

| | | |
|---|---|---|
| PATENT NO. | : 12,106,752 B2 | Page 1 of 1 |
| APPLICATION NO. | : 17/414934 | |
| DATED | : October 1, 2024 | |
| INVENTOR(S) | : Luke John Campbell et al. | |

It is certified that error appears in the above-identified patent and that said Letters Patent is hereby corrected as shown below:

In the Specification

Column 5, Line 13, delete "$d_3$," and insert --$d_3$,--.

In the Claims

Column 16, Line no. 66, Claim 7, delete "a least" and insert -- at least --.

Column 18, Line no. 34, Claim 22, delete "a least" and insert -- at least --.

Signed and Sealed this
Seventeenth Day of December, 2024

Derrick Brent
*Acting Director of the United States Patent and Trademark Office*